(12) United States Patent
Borel et al.

(10) Patent No.: US 9,313,556 B1
(45) Date of Patent: Apr. 12, 2016

(54) USER INTERFACE FOR VIDEO SUMMARIES

(71) Applicant: Logitech Europe S.A., Lausanne (CH)

(72) Inventors: Vincent Borel, Menlo Park, CA (US);
Aaron Standridge, Poteau, OK (US);
Fabian Nater, Zurich (CH); Helmut Grabner, Bonstetten (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 14/853,965

(22) Filed: Sep. 14, 2015

(51) Int. Cl.
| | | |
|---|---|---|
| *H04N 9/80* | (2006.01) | |
| *H04N 21/8549* | (2011.01) | |
| *H04N 5/247* | (2006.01) | |
| *G11B 27/036* | (2006.01) | |
| *G11B 27/34* | (2006.01) | |
| *G11B 27/00* | (2006.01) | |

(52) U.S. Cl.
CPC .......... *H04N 21/8549* (2013.01); *G11B 27/005* (2013.01); *G11B 27/036* (2013.01); *G11B 27/34* (2013.01); *H04N 5/247* (2013.01)

(58) Field of Classification Search
CPC H04N 5/247; H04N 21/4325; H04N 21/8549
See application file for complete search history.

(56) References Cited

U.S. PATENT DOCUMENTS

| | | | |
|---|---|---|---|
| 6,069,655 A | 5/2000 | Seeley et al. | |
| 6,353,461 B1 * | 3/2002 | Shore | G11B 27/034 348/239 |
| 6,803,945 B1 | 10/2004 | Needham | |
| 6,995,794 B2 | 2/2006 | Hsu et al. | |
| 8,244,103 B1 | 8/2012 | Shore | |
| 8,520,072 B1 * | 8/2013 | Slavin | G08B 13/19684 348/143 |
| 2004/0027242 A1 | 2/2004 | Venetianer et al. | |
| 2005/0160457 A1 | 7/2005 | Rui et al. | |
| 2005/0168574 A1 | 8/2005 | Lipton et al. | |
| 2005/0271251 A1 | 12/2005 | Russell | |
| 2007/0002141 A1 | 1/2007 | Lipton et al. | |
| 2008/0018737 A1 | 1/2008 | Suzuki et al. | |
| 2008/0021879 A1 | 1/2008 | Cheng | |
| 2008/0100704 A1 | 5/2008 | Venetianer et al. | |
| 2009/0031381 A1 | 1/2009 | Cohen | |
| 2009/0219300 A1 | 9/2009 | Peleg et al. | |
| 2010/0082585 A1 | 4/2010 | Barsook et al. | |
| 2010/0092037 A1 | 4/2010 | Peleg et al. | |
| 2010/0315497 A1 | 12/2010 | Jiang | |
| 2011/0285842 A1 | 11/2011 | Davenport et al. | |

(Continued)

OTHER PUBLICATIONS

Oliva, Aude and Antonio Torralba, "Modeling the shape of the scene: a holistic representation of the spatial envelope," International Journal of Computer Vision, vol. 42(3): 145-175, 2001.

(Continued)

*Primary Examiner* — Huy T Nguyen
(74) *Attorney, Agent, or Firm* — Kilpatrick Townsend & Stockton LLP

(57) ABSTRACT

In one embodiment, the User Interface (UI) provides a live stream from the webcam, with markers on the side indicating the stored, detected important events (such as by using a series of bubbles indicating how long ago an event occurred). The indicators are marked to indicate the relative importance, such as with color coding. Upon selection of an indicator by the user, the time-lapse summary is displayed, along with a time of day indication. Alternately, the user can select to have a time-lapse display of all the events in sequence, using a more condensed time lapse, with less important events having less time or being left out.

18 Claims, 7 Drawing Sheets

(56) References Cited

U.S. PATENT DOCUMENTS

| | | |
|---|---|---|
| 2012/0308077 A1 | 12/2012 | Tseng |
| 2013/0024891 A1 | 1/2013 | Elend |
| 2014/0013228 A1 | 1/2014 | Hutten |
| 2014/0176708 A1 | 6/2014 | Ramakrishnan |
| 2014/0355907 A1 | 12/2014 | Pesavento et al. |
| 2015/0015735 A1 | 1/2015 | Rav-Acha et al. |
| 2015/0091737 A1 | 4/2015 | Richardson |
| 2015/0189402 A1 | 7/2015 | Outtagarts et al. |
| 2015/0296187 A1* | 10/2015 | Baldwin ............ G06F 3/04842 348/143 |
| 2015/0350611 A1 | 12/2015 | Pearson et al. |
| 2016/0012609 A1* | 1/2016 | Laska .................. G06T 7/2033 382/103 |

OTHER PUBLICATIONS

U.S. Appl. No. 14/853,943, filed Sep. 14, 2015 by Vincent Borel et al. (Unpublished.).

U.S. Appl. No. 14/853,980, filed Sep. 14, 2015 by Vincent Borel et al. (Unpublished.).

U.S. Appl. No. 14/853,989, filed Sep. 14, 2015 by Vincent Borel et al. (Unpublished.).

Preinterview First Office Action, dated Jan. 11, 2016, for U.S. Appl. No. 14/853,943, filed Sep. 14, 2015, 5 pages.

* cited by examiner

USER INTERFACE FOR VIDEO SUMMARIES

BACKGROUND OF THE INVENTION

The invention generally relates to improvements in methods of automatic video editing, and more specifically to methods used in automatically creating summaries based on webcam video content, as determined by image analysis.

Devices such as video cameras and microphones are often used for monitoring an area or a room. Existing video editing and monitoring systems typically record events when motion is detected, and provide alerts to a user over the Internet. The user can then view just the stored portions of the monitored area when motion was detected. A summary can, for example, provide a series of still images from each video, to give the user a sense of whether the motion is worth viewing. For example, the user can see if a person is in the scene, or if the motion appears to have been a drape moving, a bird, etc.

Magisto Pub. No. 20150015735 describes capturing images, as opposed to editing, based on various factors, and detecting important objects and deciding whether to take a video or snapshot based on importance (e.g., whether someone is smiling). BriefCam has patents that describe detecting an amount of activity, or objects, moving in an image, and overlaying different object movements on the same image, as a mosaic. See, e.g., Pub. 2009-0219300 (refers to different sampling rates on the image acquisition side) and Pub. 2010-0092037 (refers to "adaptive fast-forward"). Pub. No. 20150189402 describes creating a video summary of just detected important events in a video, such as shots in a soccer match. See also Pub. No. 20050160457, which describes detecting baseball hits visually and from excited announcer sound.

Pub. No. 20100315497 is an example of systems capturing the images based on face recognition, with a target face profile. ObjectVideo Pub. No. 20070002141 describes a video-based human verification system that processes video to verify a human presence, a non-human presence, and/or motion. See also Wells Fargo Alarm Services U.S. Pat. No. 6,069,655. Pub. No. 2004-0027242 also describes detecting humans, and other objects. "Examples include vehicles, animals, plant growth (e.g., a system that detects when it is time to trim hedges), falling objects (e.g., a system that detects when a recyclable can is dropped into a garbage chute), and microscopic entities (e.g., a system that detects when a microbe has permeated a cell wall)."

Pub. No. 20120308077 describes determining a location of an image by comparing it to images from tagged locations on a social networking site. Pub. No. 20110285842 describes determining a location for a vehicle navigation system by using landmark recognition, such as a sign, or a bridge, tunnel, tower, pole, building, or other structure Sony Pub. No. 2008-0018737 describes filtering images based on appearance/disappearance of an object, an object passing a boundary line, a number of objects exceeding a capacity, an object loitering longer than a predetermined time, etc.

ObjectVideo Pub. No. 2008-0100704 describes object recognition for a variety of purposes. It describes detecting certain types of movement (climbing fence, move in wrong direction), monitoring assets (e.g., for removal from a museum, or, for example: detecting if a single person takes a suspiciously large number of a given item in a retail store), detecting if a person slips and falls, detecting if a vehicle parks in a no parking area, etc.

Pub. No. 2005-0168574 describes "passback" [e.g., entering through airport exit] detection. There is automatic learning a normal direction of motion in the video monitored area, which may be learned as a function of time, and be different for different time periods. "The analysis system 3 may then automatically change the passback direction based on the time of day, the day of the week, and/or relative time (e.g., beginning of a sporting event, and ending of sporting event). The learned passback directions and times may be displayed for the user, who may verify and/or modify them."

Logitech U.S. Pat. No. 6,995,794 describe image processing split between a camera and host (color processing and scaling moved to the host). Intel U.S. Pat. No. 6,803,945 describes motion detection processing in a webcam to upload only interesting "interesting" pictures, in particular a threshold amount of motion (threshold number of pixels changing).

Yahoo! Pub. No. 20140355907 is an example of examining image and video content to identify features to tag for subsequent searching. Examples of objects recognized include facial recognition, facial features (smile, frown, etc.), object recognition (e.g., cars, bicycles, group of individuals), and scene recognition (beach, mountain). See paragraphs 0067-0076. See also Disney Enterprises Pub. No. 20100082585, paragraph 0034.

BRIEF SUMMARY OF THE INVENTION

In one embodiment of the present invention, a remote video camera intermittently transmits video clips, or video events, where motion is detected to a remote server. The remote server provides video summaries to an application on a user device, such as a smartphone.

In one embodiment, the User Interface (UI) provides a live stream from the webcam, with markers on the side indicating the stored, detected important events (such as by using a series of bubbles indicating how long ago an event occurred). The indicators are marked to indicate the relative importance, such as with color coding. Upon selection of an indicator by the user, the time-lapse summary is displayed, along with a time of day indication. Alternately, the user can select to have a time-lapse display of all the events in sequence, using a more condensed time lapse, with less important events having less time or being left out.

In another embodiment, the UI, upon the application being launched, provides a video summary of content since the last launch of the application. The user can scroll through the video at a hyper-lapse speed, and then select a portion for a normal time lapse, or normal time view.

DETAILED DESCRIPTION OF THE INVENTION

Camera Diagram.

Figure 1:
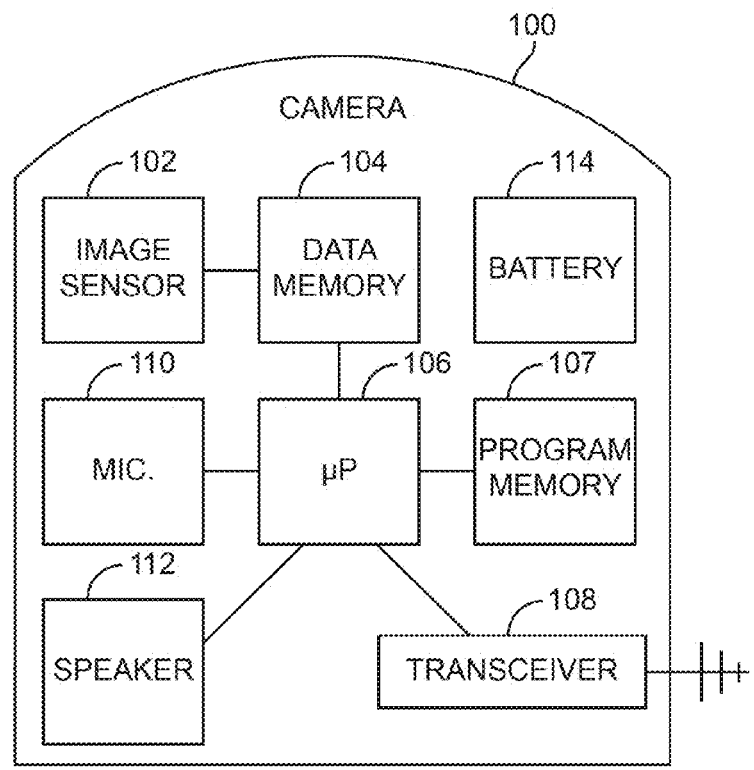
FIG. 1 is a block diagram of a camera used in an embodiment of the invention.

FIG. 1 is a block diagram of a camera used in an embodiment of the invention. A camera 100 has an image sensor 102 which provides images to a memory 104 under control of microprocessor 106, operating under a program in a program memory 107. A microphone 110 is provided to detect sounds, and a speaker 112 is provided to allow remote communication. A transceiver 108 provides a wireless connection to the Internet, either directly or through a Local Area Network or router. A battery 114 provides power to the camera.

System Diagram.

Figure 2:
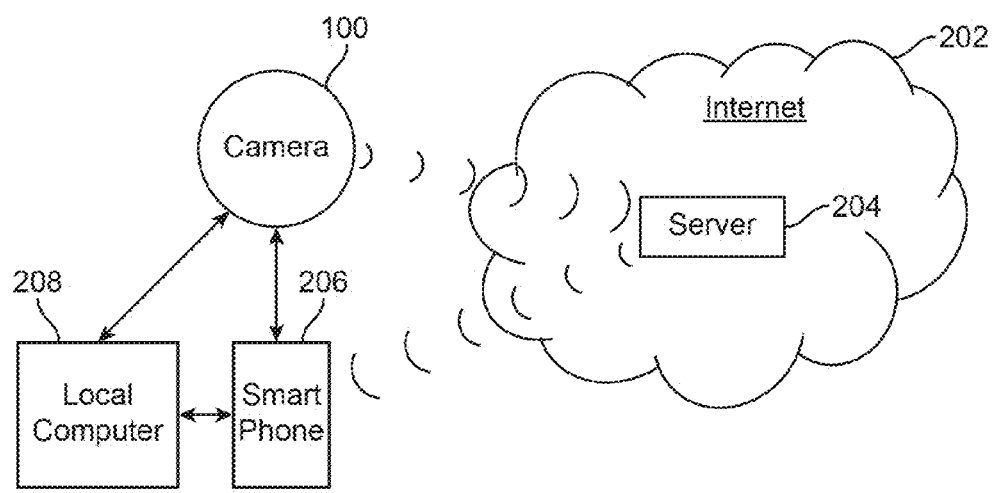
FIG. 2 is a block diagram of a cloud-based system used in to an embodiment of the invention.

FIG. 2 is a block diagram of a cloud-based system used in to an embodiment of the invention. Camera 100 connects wirelessly through the Internet 202 to a remote server 204. Server 204 communicates wirelessly with a smart phone 206, or other user computing device. Camera 100 can also connect locally to smart phone 206, or to a local computer 208. The local computer can do some of the image processing, such as advanced motion detection and object recognition and tagging, and can return the processed video and tags to camera 100 for subsequent transmission to server 204, or local computer 208 could directly transmit to server 204, such as when camera 100 is in a low power, battery mode.

Flowchart of Operation.

Figure 3:
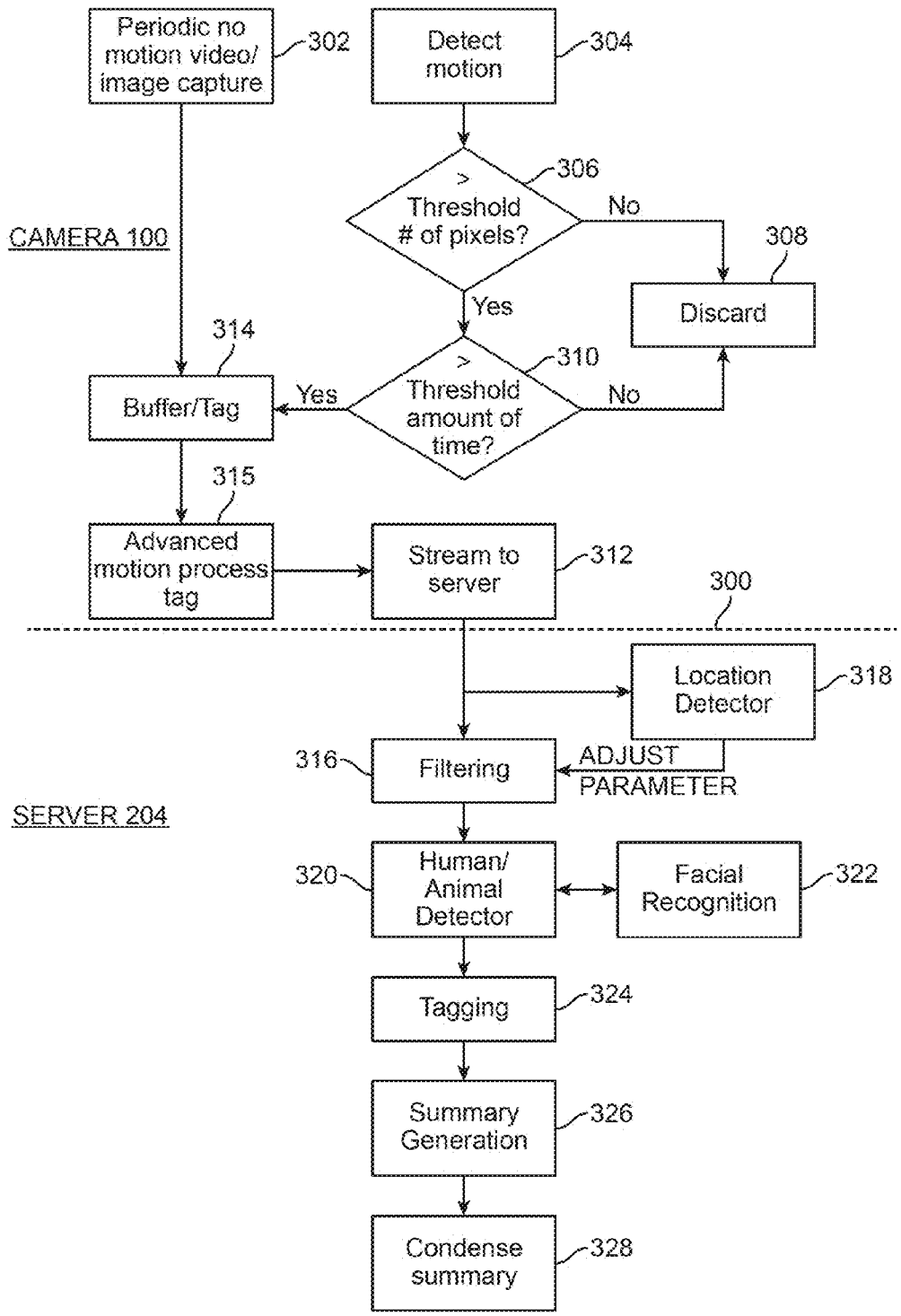
FIG. 3 is a flowchart illustrating the basic steps performed in the camera and the server according to an embodiment of the invention.

FIG. 3 is a flowchart illustrating the basic steps performed in the camera and the server according to an embodiment of the invention. The steps above dotted line 300 are performed in the camera 100, while the steps below the dotted line are performed in the server 204. When there is no significant motion detected, the camera periodically captures a short video (e.g., 4 seconds) or a still image, such as every 8 minutes (302). The captured short video is buffered and tagged. Such camera tags include at least the time and date and the lack of motion.

The camera is programmed to detect motion (step 304) from image analysis. If the amount of motion, such as the number of pixels changing, is less than a predetermined amount (306), the video of the motion is discarded (308). If the amount of motion is greater than the threshold, it is determined whether the motion lasts for more than a predetermined amount of time (310). If the motion time is less than the predetermined time, it is discarded (308). If the motion lasts for more than the predetermined time, it is sent to a buffer and tagged with metadata (314). Such camera metadata tags include the time and date, the length of the video, and the amount of motion.

In one embodiment, more advanced motion detection and object recognition can be done on the camera (315), or in a local computer. The combined video events are then streamed wirelessly to the remote server (312). The images and video can be higher resolution than the bandwidth used for streaming. By locally buffering the images and video, it can be streamed with a delay, and transmitted at a lower frame rate. Thus, for example, there may be 15 video events of no motion, that are 4 seconds each, and a 5 minute second motion video. These can be buffered, and streamed over 20 minutes, for example. This provides a time-delayed stream, but with more resolution at lower bandwidth.

The remote server tags the received still images as having no motion. The remote server filters (316) the received video. The filtering is designed to eliminate video motion that is not of interest. For example, algorithms process the video to determine the type of motion. If the motion is a curtain moving, a moving shadow of a tree on a window, a fan in the room, etc., it can be filtered out and discarded.

A location detector 318 can be used to process the image to determine the type of location of the camera. In particular, is it inside or outside, is it in a dining room or a conference room, etc. Artificial intelligence can be applied to determine the location. For example, instead of a complex object recognition approach, a holistic review of the image is done. The image is provided to a neural network or other learning application. The application also has accessed to a database of stored images tagged as particular locations. For example, a wide variety of stored images of kitchens, dining rooms and bedrooms are provided. Those images are compared to the captured video or image, and a match is done to determine the location. Alternately, a user interface can allow a user to tag the type of location. The user interface can provide the user with the presumed location, which the user can correct, if necessary, or further tag (e.g., daughter's bedroom). One example of a holistic image review process is set forth in "Modeling the shape of the scene: a holistic representation of the spatial envelope," Aude Oliva, Antonio Torralba, International Journal of Computer Vision, Vol. 42(3): 145-175, 2001.

In addition to determining a location, a more specific determination of a "scene" is done. For example, the location may be a bedroom, while the scene is a sleeping baby. In one embodiment, the user is prompted to label the scene (e.g., as sleeping baby). Alternately, there can be automatic detection of the scene using a neural network or similar application, with comparisons to images of particular scenes, and also comparisons to previously stored images and videos labelled by the user. In addition, various cues are used in one embodiment to determine the type of scene. For example, for a "sleeping baby," the video may be matched to a baby in bed scene from examination of the video. This is combined with other cues, such as the time of day indicating night time, the camera being in night mode, a microphone detecting sounds associated with sleeping, etc. Similarly, a birthday party can be detected holistically using different cues, including the comparison to birthday party images, motion indicating many individuals, singing (e.g., the song "Happy Birthday"), etc. In one embodiment, previous scenes for a user are stored, and used for the comparison. For example, a previous scene may be for "breakfast," after having the user prompted to confirm. By using similar scenes from the same location for the same user, the accuracy of identification can be improved over time.

Once the location type is determined, the filtering parameters can be provided to filtering block 316. In general, the location/scene would set some priorities about what is expected and what, in that particular situation, is more relevant/interesting to the user. What is interesting in one scene might not be interesting in another scene. For example, if the location is a living room, there would be suppression of constant motion at a particular spot which quit likely might be due to a TV or a fan. For an outdoor location, much more motion is expected due to wind or other weather conditions. Hence the parameters of the video processing (e.g., thresholds) are adapted in order to suppress such motions (moving leaves, etc.). Also, regular motion patterns in an outdoor setting are suppressed in one embodiment (e.g., cars passing by on the street). In contrast, if the setting is a conference room and the scene is a meeting, spotting small motion is relevant to show people sitting together and discussing, but not moving much. In another example, where the scene is a sleeping baby, a different filtering is provided, to capture small movements of the baby, and not filter them out. For example, it is desirable to confirm that the baby is breathing or moving slightly.

Once extraneous motion is eliminated, the program determines if a human or animal is present (320). The particular human can be identified using facial recognition (322). The user can tag various individuals to initialize this process. Certain animals can be identified the same way, such as by the user providing a photo of the family pet, or tagging the pet in a video captured.

Video that passes through the filtering, and has a human or animal identified, is then tagged (324) with context data. The tag, or metadata, includes the identity of the persons or animals, the time of day, the duration of the video, etc. In one embodiment, there is extraction of other meta-data which is helpful for further learning and personalization. Examples include the "colorfulness," the amount of motion, the direction/position where motion appears, the internal state of the camera (e.g. if it is in night vision mode), the number of objects, etc. Most of this data is not accessible by the user. However, this (anonymous) data provides a foundation for gathering user-feedback and personalization.

In one embodiment, supervised personalization is provided (user directed, or with user input). This personalization is done using various user input devices, such as sliders and switches or buttons in the application, as well as user feedback. Unsupervised personalization is provided in another embodiment, where the application determines how to personalize for a particular user without user input (which is supplemented with actual user input, and/or corrections). Examples of unsupervised personalization include using statistics of the scene and implicit user feedback. The use of cues to determine if there is a sleeping baby, as discussed above, in an example of unsupervised personalization.

Various types of user feedback can be used to assist or improve the process. For example, the user can be prompted to confirm that a "sleeping baby" has been correctly identified, and if not, the user can input a correct description. That description is then used to update the data for future characterizations.

A summary of a day or other period of time (e.g., since the last application launch) is then generated (326) using the still images and video. The summary is then condensed (328) to fit into a short time clip, such as 30 seconds. This condensing can reduce the number of still images used (such as where there is a long sequence without motion), and can also reduce, or fast forward the video at different rates, depending on the determined importance.

User Interface with Day Summary, Bubble Icons.

Figure 4:
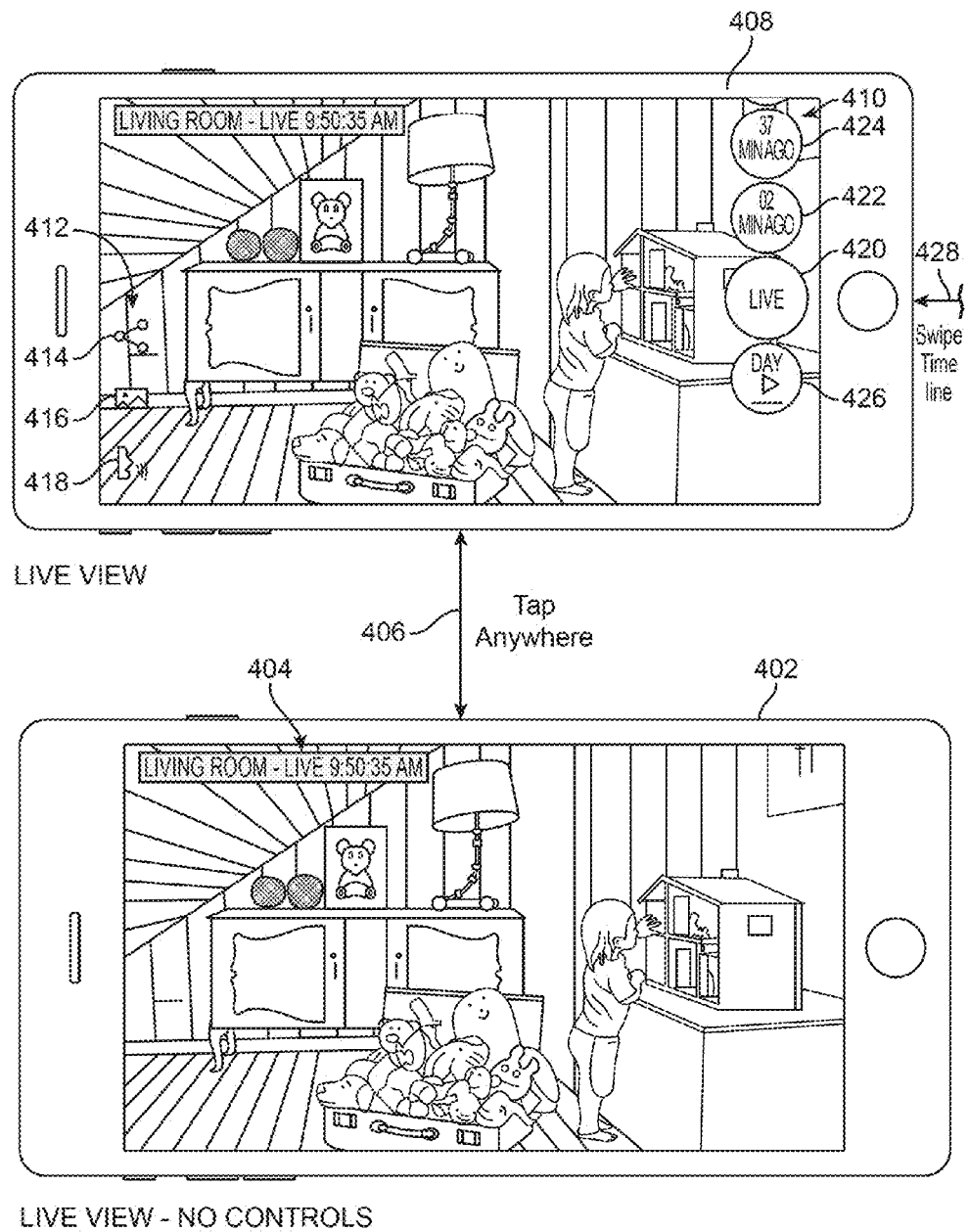
FIG. 4 is a diagram illustrating the transition to different user interface display camera views according to an embodiment of the invention.
Figure 4:
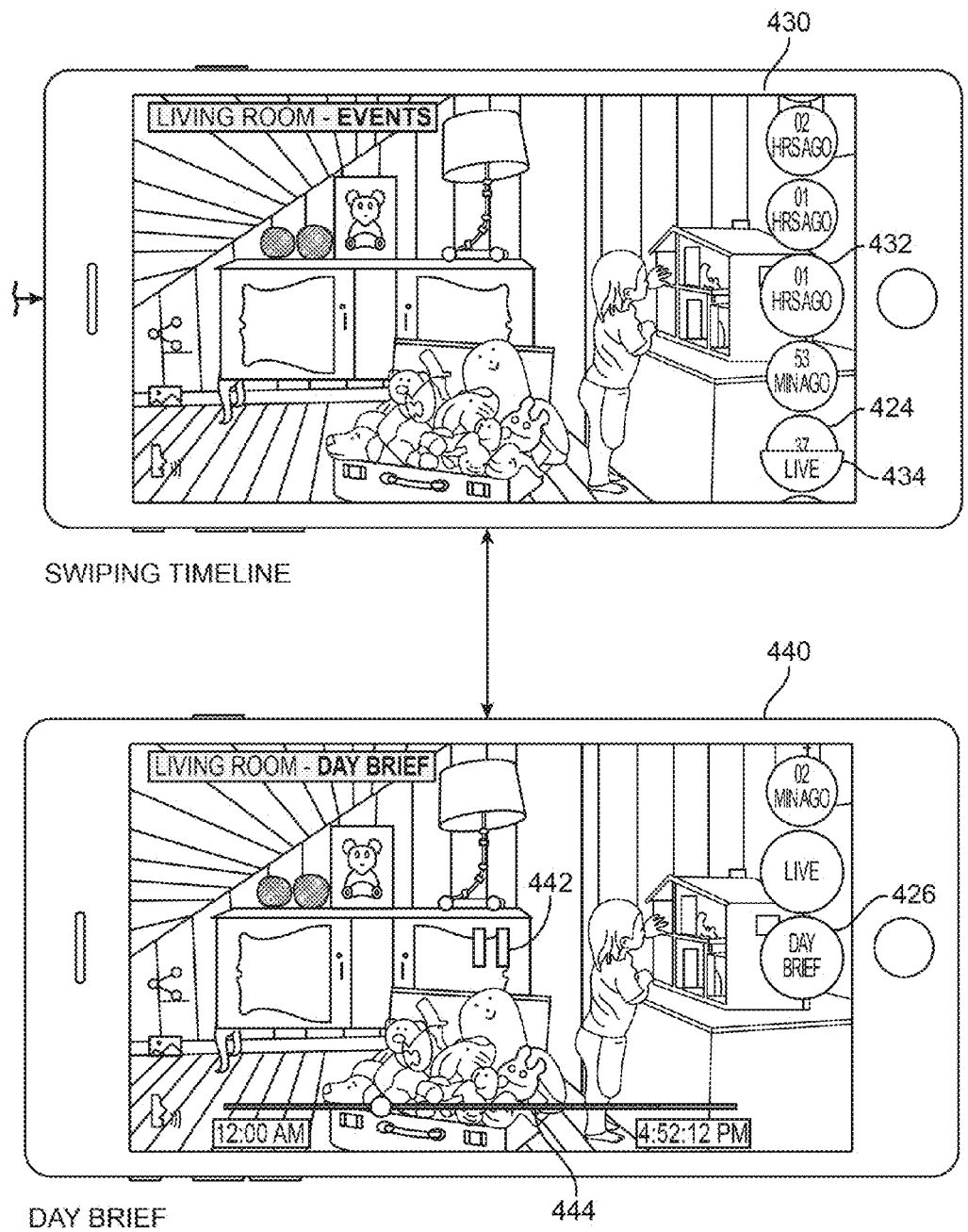

FIG. 4 is a diagram illustrating the transition to different user interface display camera views according to an embodiment of the invention. A display 402 provides a live video stream (at a lower resolution than the time delayed summaries). In one embodiment, when the user activates the application on the smart phone or other user computing device, a signal is relayed through the server to the webcam to start the webcam streaming images. This provides the live view shown. Certain data is overlaid on the display at position 404. In the example shown, that data is an indication of the location or other label given to the webcam (living room), an indication that it is a live streaming view (live), and a clock indicating the current time.

When the user taps on the screen (406), the display transitions to a view 408 which includes a series 410 of bubble indicators for stored video scenes. View 408 also provides a series of icons 412. Icon 414 is for sharing the video summary with others, icon 416 is for storing the video to a gallery, and icon 418 is for activating a speaker to talk to whomever is in the room with the webcam, like a walkie-talkie push to talk function.

The series of bubble icons 410 includes a larger bubble 420 indicating "live view." Icon 410 corresponds to what is currently being displayed, and is enlarged to show which view is selected. Icons 422 and 424 indicate videos captured for important motion detection events, with the numbers in the bubbles indicating how long ago the video was captured (e.g., 2 minutes and 37 minutes in the example shown). Alternately, the bubbles can have a timestamp. The color of bubbles 422 and 424 indicates the determined importance of the event captured. If the user were to select, for example, bubble 422, that bubble would be locked in and increase in size, while moving the middle of the series. A still image from that event would be displayed as the user is scrolling through the bubbles, and the video starts to play once the event is locked in, or the user activates a play button. Bubble 426 is a "day brief" which will display the condensed summary of the day, from step 328 in FIG. 3. In one embodiment, images or icons can provide more information about the scene indicated by a bubble, such as an image of a dog or cat to indicate a scene involving the family pet, or a picture or name tag of a person or persons in the scene.

When the user swipes the timeline (428) on display 408, the series of bubbles moves as indicated in view 430. As shown, the bubbles have moved downward, with the 37 minute bubble 424 about to disappear, and a 1 hr. bubble 432 currently enlarged. A semicircle 434 indicates the actual view being displayed is the live view. Alternately, as each bubble becomes enlarged, upon reaching the middle of the side of the screen, a still image from that video is displayed. Thus, a still image from the motion 1 hour ago would be displayed for button 432. When the user releases his/her finger, the video for that event 1 hour ago would begin to play. In one embodiment, certain tags could be displayed along with the still, preview image. For example, the names of persons in the event, as determined by facial recognition, could be displayed. Additionally, the event could be categorized based on time and object recognition (e.g., breakfast), or interaction with a calendar (e.g., client X meeting).

Display 440 shows the "day brief" bubble 426 after being selected (with the play icon eliminated). The video is then played, with a pause icon 442 provided. A timeline 444 is provided to show progress through the day brief.

GUI Menus.

Figure 5:
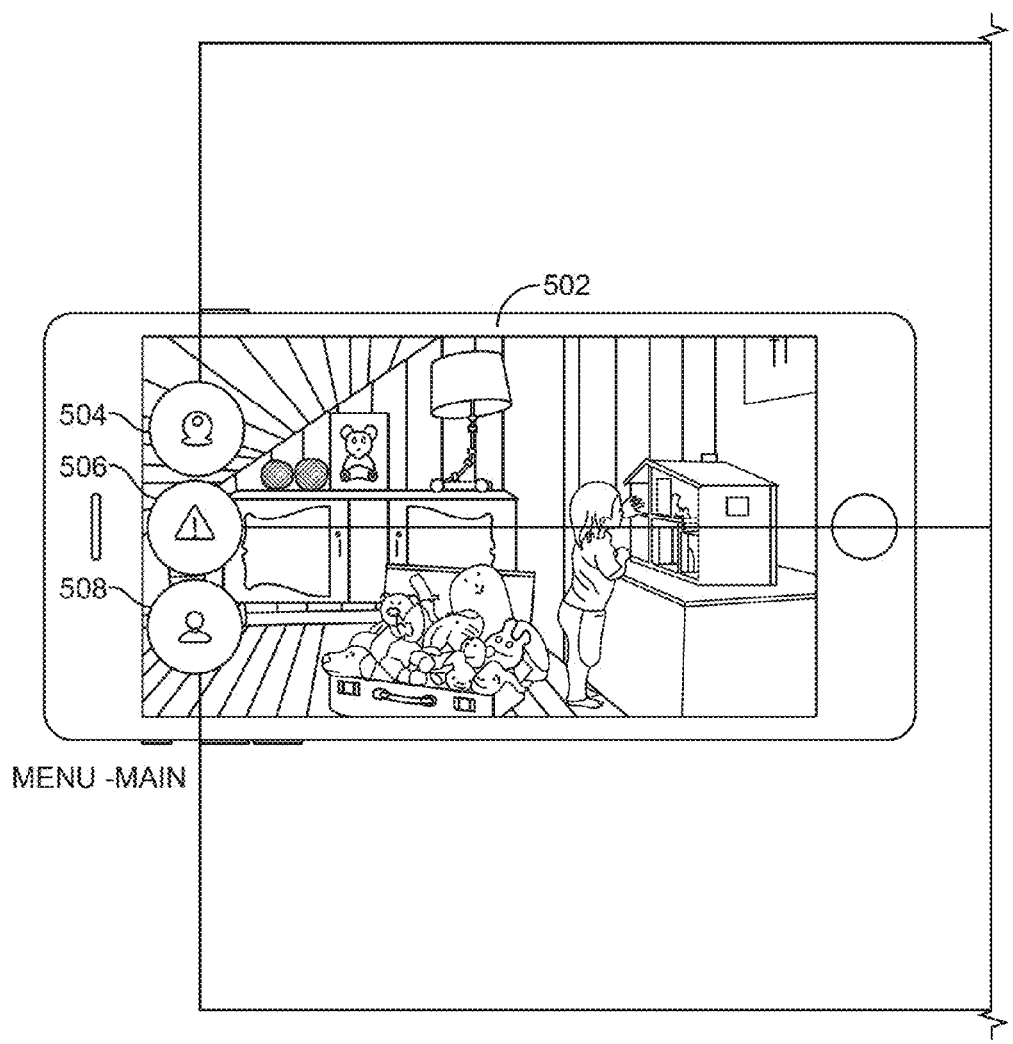
FIG. 5 is a diagram illustrating the transition to different user interface display menus according to an embodiment of the invention.
Figure 5:
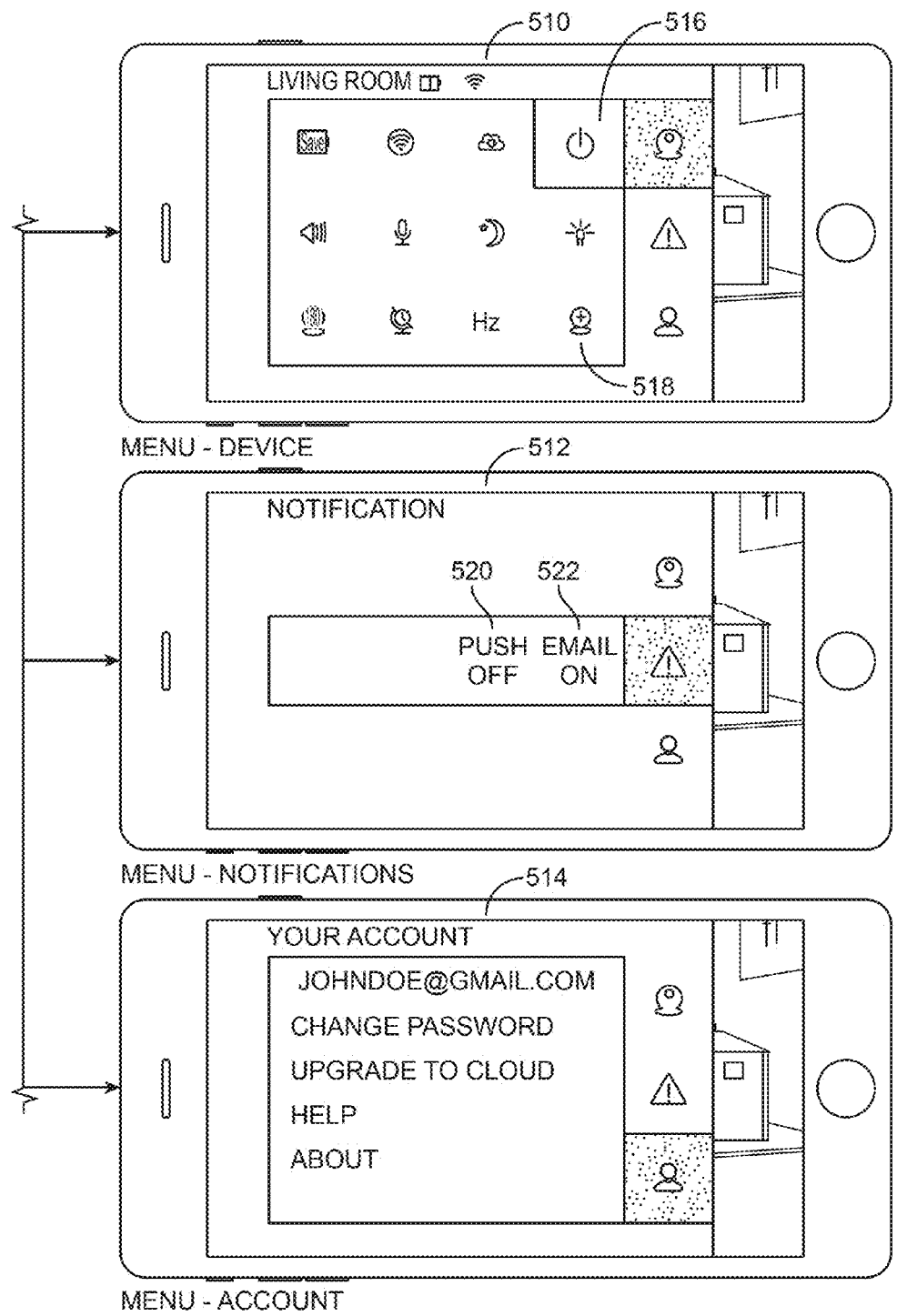

FIG. 5 is a diagram illustrating the transition to different user interface display menus according to an embodiment of the invention. A display 502 is activated by swiping to the right from the left side of the screen. This pulls up 3 menu icons 504, 506 and 508. Tapping icon 504 brings up device menu screen 510. Tapping icon 506 brings up notifications menu 512. Tapping icon 514 brings up account menu 514.

On display 510 are a variety of icons for controlling the device (webcam). Icon 516 is used to turn the webcam on/off. Icon 518 is used to add or remove webcams. On display 512, icon 520 allows activation of pushing notifications to the smart phone, such as with a text message or simply providing a notification for an email. Icon 522 provides for email notification. Display 514 provides different account options, such as changing the password, and upgrade to cloud (obtaining cloud storage and other advanced features).

Multiple Cameras, Split View Display

Figure 6:
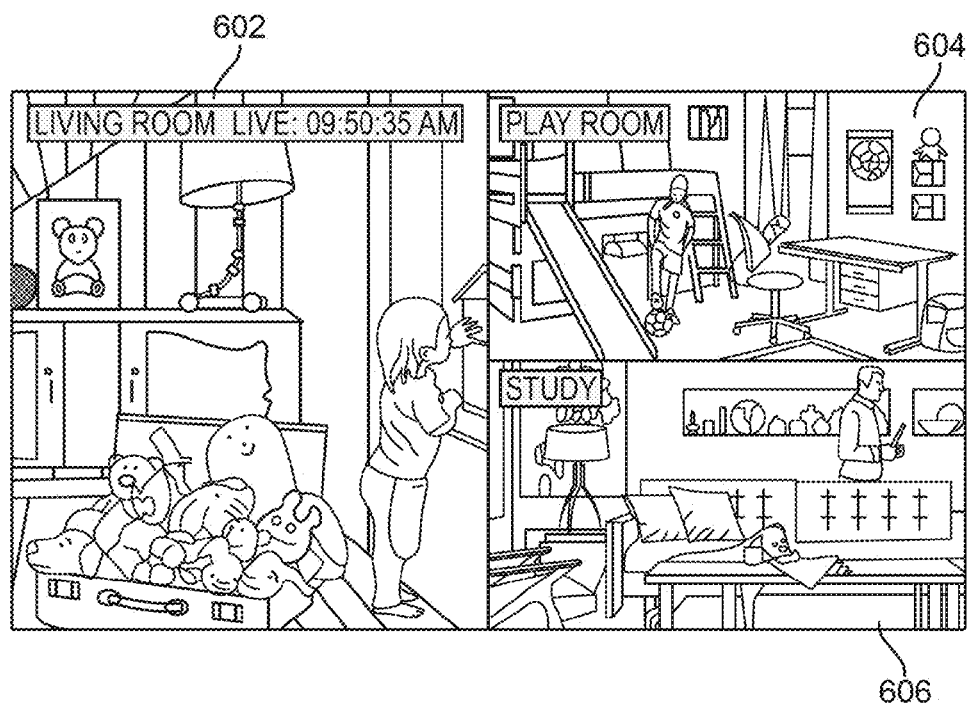
FIG. 6 is a diagram illustrating a split user interface display for multiple webcams according to an embodiment of the invention.

FIG. 6 is a diagram illustrating a split user interface display for multiple webcams according to an embodiment of the invention. Display 602 is the main, large display showing the living room webcam. Display 604 shows a play room webcam and display 606 shows a study webcam. In one embodiment, the display of FIG. 6 is the default display provided when the application is launched. In one embodiment, a primary display provides streaming video, while the other displays provide a still image. Alternately, all displays can provide streaming video. The primary display can be the first camera connected, or a camera designated by the user.

User Interface with Initial Launch of Summary Since Last Activity

In another embodiment, the UI, upon the application being launched, provides a video summary of content since the last launch of the application. The user can scroll through the video at a hyper-lapse speed, and then select a portion for a normal time lapse, or normal time view. The user can also switch to real-time live streaming, at a lower resolution than the time-delayed summaries. The summaries are continually updated and weighted. For example, a summary may contain 8 events with motion after 4 hours. When additional events are detected, they may be weighted higher, and some of the original 8 events may be eliminated to make room for the higher weighted events. Alternately, some of the original, lower-weighted events may be given a smaller portion of the summary, such as 2 seconds instead of 5 seconds. In one embodiment, the user can access a more detailed summary, or a second tier summary of events left out, or a longer summary of lower-weighted events.

Scene Intuition.

Scene intuition is determining the relevance of detected events, in particular motion. At a basic level, it involves the elimination of minimal motion, or non-significant motion (curtains moving, a fan moving, shadows gradually moving with the sun during the day, etc.). At a higher level, as discussed in more detail in examples below, it involves determining the camera location from objects detected (indoor or outdoor, kitchen or conference room). An activity can be detected from people or pets detected. A new scene may be tagged if a new person enters or someone leaves, or alternately if an entirely different group of people is detected. Different detected events can be assigned different event bubbles in the UI example above.

The assignment of video to different summaries, represented by the bubbles, involves grouping "meaningful" things together. For example, different activities have different lengths. Eating breakfast might be a rather long one, while entering a room might be short. In one embodiment, the application captures interesting moments which people would like to remember/save/share (e.g. kids having a pillow fight, etc.). Primary cues for determining when a scene, or activity, begins and ends include the amount of time after movement stops (indicating the end of a scene), continuous movement for a long period of time (indicating part of the same scene, new motion in a different place (indicating a new scene), and a change in the number of objects, or a person leaving, or a new person entering.

Search.

By providing tags, or metadata, the videos can be easily searched. By classifying videos into different scenes, searching can be based on the type of scene. The searching can also be based on time, duration of clips, people in the video, particular objects detected, particular camera location, etc. In one embodiment, the application generates default search options based on matching detected content with possible search terms. Those possible search terms can be input by the user, or can be obtained by interaction with other applications and data of the user. For example, the user may have tagged the names of family members, friends or work associates in a social media or other application, with images corresponding to the tags. The present application can then compare those tagged images to faces in the videos to determine if there is a match, and apply the known name. The default search terms would then include, for example, all the people tagged in the videos for the time period being searched.

In one embodiment, tags are provided with later searching in mind. Tags are provided for the typical things a user would likely want to search for. One example is taking the names of people and pets. Another example is tagging moving objects or people. The type of object that is moving is tagged (car, ball, person, pet, etc.). In one embodiment, while a holistic approach is used rather than object detection for determining a scene, object detection is used for moving objects. Other tags include the age of people, the mood (happy—smiles, laughing detected, or sad—frowns, furrowed brows detected).

In one embodiment, video search results are ranked based on the weighting of the video summaries, as discussed below and elsewhere in this application. Where multiple search terms are used, the results with the highest weighting on the first search term are presented first in one embodiment. In another embodiment, the first term weighting is used to prioritize the results within groups of videos falling within a highest weighting range, a second highest weighting range, etc.

In one embodiment, video search results also include events related to the searched term. For example, a search for "Mitch Birthday" will return video events tagged with both "Mitch" and "Birthday." In addition, below those search results, other video events on the same date, tagged "Mitch," but not tagged "Birthday," would also be shown. The "Birthday" tag may be applied to video clips including a birthday cake, presents, and guests. But other video events the same day may be of interest to the user, showing Mitch doing other things on his birthday.

Temporal (Time Delayed) Streaming.

As described above, video and images can be captured at high resolution, buffered, and then streamed over a longer period of time. This is possible since there is not constant live streaming, but only streaming of periodic no motion clips, and intermittent motion clips. For example, images can be captured at 2-3 megabytes, but then streamed at a bandwidth that would handle 500 kilobits live streaming. In one embodiment, the image data is stored in the camera memory, transcoded and transmitted.

When the video summaries are subsequently viewed by the user, they can be streamed at high bandwidth, since they are only short summaries. Alternately, they can also be buffered in the user's smart phone, in a reverse process, with an additional time delay. Alternately, the video can be delivered at low resolution, followed by high resolution to provide more detail where the user slows down the time lapse to view in normal time, or to view individual images.

Split of Processing Between Local Camera and Remote Server

In one embodiment, a webcam provides a coarse filtering and basic processing of video, which is transmitted to the "cloud" (a remote server over the Internet) for further processing and storing of the time-lapse video sequences. More processing can be done on the local camera to avoid cloud processing, while taking advantage of larger cloud storage capability. A user can access the stored video, and also activate a live stream from the webcam, using an application on a smartphone.

In one embodiment, the local camera detects not only motion, but the direction of the motion (e.g., left to right, into room or out of room). The origin of the motion can also be determined locally (from the door, window, chair, etc.) In addition, the local camera, or a local computer or other device in communication with the camera, such as over a LAN, can do some processing. For example, shape recognition and object or facial recognition and comparison to already tagged images in other use applications (e.g., Facebook) could be done locally. In one embodiment, all of the processing may be done locally, with access provided through the cloud (Internet).

In one embodiment, the processing that is done on the camera is the processing that requires the higher resolution, denser images. This includes motion detection and some types of filtering (such as determining which images to perform motion detection on). Other functions, such as location detection, can be done on lower resolution images and video that are send to the cloud.

Low Power, Battery Mode.

In one embodiment, the camera can be plugged into line power, either directly or through a stand or another device, or it can operate on battery power. Thus, the camera has a high power (line power) mode, and a low power (battery) mode. In the battery mode, power is conserved through a combination of techniques. The number of frames analyzed for motion is reduced, such as every $5^{th}$ frame instead of a normal every $3^{rd}$ frame. Also, only basic motion detection is performed in the camera, with more complex motion recognition and object detection done by a processor in the remote server, or a local computer. The camera is put into a sleep mode when there is no motion, and is woken periodically (e.g., every 8 minutes) to capture a short video or image. Those videos/images can be stored locally, and only transmitted when there is also motion video to transmit, at some longer period of time, or upon request, such as upon application launch. In one embodiment, in sleep mode everything is turned off except the parts of the processor needed for a timer and waking up the processor. The camera is woken from sleep mode periodically, and the image sensor and memory are activated. The transmitter and other circuitry not needed to capture and process an image remains asleep. An image or video event is detected. The image or video event is compared to a last recorded image, or video event. If there is no significant motion, the camera is returned to the sleep mode.

Tags.

In one embodiment, tags are included for each frame of data. Alternately, tags may be applied to a group of frames, or some tags may be for each frame, with other tags for a group of frames. As described above, minimum tags include a time stamp and indication of motion present, along with the amount of motion. Additional tags include:

Object identification
Person identification
Camera location
Speed of motion
Direction of motion
Location of motion (e.g., a person entering the room)
Type of motion (e.g., walking running, cooking, playing, etc.).

Initialization.

In one embodiment, the product comprises at least one camera with at least a microphone, and an application that can be downloaded to a smart phone or other device. Upon the initial launch, the application executes a series of steps. It prompts the user to enter the a variety of information, including name, email, etc.

The application will automatically, or after a user prompt, access user data and other applications to build a profile for use in object, people and event detection. For example, a user's social media applications may be accessed to obtain tagged images identifying the user's family, friends, etc. That data can be uploaded to the cloud, or provided to the processor on the camera or another local processing device for use in examining videos. Also, the user's calendar application may be accessed to determine planned meetings, locations and participants to match with a camera location, where applicable.

Sharing.

In one embodiment, the summaries or live streams can be shared with others using a variety of methods. For example, applications such as Periscope or Meercat can be used to share a stream, or set a time when video summaries will be viewable. A video event can also be shared on social networking and other sites, or by email, instant message, etc. In one embodiment, when the sharing icon is selected, the user is presented with options regarding what method of sharing to use and also with whom to share. For example, a list of people identified in the video summary is presented for possible sharing.

Sensor Variations.

The camera can be part of an episode capture device which includes other sensors, such as a microphone. The camera in certain embodiments can monitor any type of event or interaction or change in an environment that can be detected by a sensor and subsequently recorded, including but not limited to an image recording device, whether in the form of an image, an audio file, a video file, data file or other data storage mechanism, including, but not limited to: motion, date and time, geographic location, and audio, a motion sensor, including the combination of a motion sensor with an algorithm capable of identifying certain types of motion, proximity sensor, temperature sensor, capacitive sensor, inductive sensor, magnet, microphone, optical sensor, antenna, Near Field Communication, a magnetometer, a GPS receiver and other sensors. The cameras can be digital cameras, digital video cameras, cameras within smartphones, tablet computers, laptops or other mobile devices, webcams, and similar.

Breakfast Example.

The present invention offers the ability to add tags with contextual relevance to a stream of data representing an event that has occurred. One example is where a camera is set up to observe a kitchen from 6 AM to 6 PM. Events occur within the scene viewed by the camera, such as a family eating breakfast. The recorded content is analyzed for context. For example, the camera analyses the data based on audio excerpts of the noise of plates being used, determining that it is placed in a kitchen and there is a meal taking place. Selecting audio data is merely one example of how this may be achieved, but other techniques will be apparent to the skilled person for performing this task. Further, the analysis may be performed within the camera, in another locally connected device, or remotely (such as in the cloud). A contextual tag is then allocated to data recorded at the time the noise of plates is detected. For example, this may occur at 7:15 AM, and the camera further recognises that the people present within the scene are family members, using facial recognition techniques. This creates the opportunity to add a further contextual tag based on the additional information due to the identification of the family members but also based on the time information, which is utilised to form a timestamp. Timestamp information may be used in correlation with the additional sensed information to distinguish an event from other events with similar actions, e.g. to identify the event as "breakfast" in contrast to "lunch" or "dinner". Using such contextual tags allows the creation of a fully customisable summary. The summary may be based upon predetermined criteria or upon user preferences. The scene is therefore monitored over an extended period of time, analysed and contextual tags and timestamps applied appropriately.

When an event or a portion of the summary is selected by user, the contextual tags and timestamps enable the generation of a more specific summary focused on a particular context within the scene, or the context of a particular event. Taking the breakfast example it is possible to select a summary comprising a short video sequence, or a summary comprising a summary of relevant information to the event "breakfast", such as who was in attendance, how long did breakfast last and so on. The information relevant to the event can also be displayed as text information overlaying the presented video sequence. Another possibility is a summary comprising details of the same event occurring regularly within a scene, such as a summary of breakfasts occurring over the previous seven days. The present invention therefore offers a completely flexible manner of producing a summary based upon the assignment of contextual tags to events occurring within a scene, which may be fully selectable and determined by a user, or determined dynamically by an episode capture device, or a combination of both. This is described further in a series of non-limiting examples below.

Conference Room Example.

A video data recording device, such as a camera, able to communicate with a communication network such as the internet, a local area network (LAN), or cellular network for transmitting data, is placed in a conference room. Initially the camera observes the scene, that is, monitors all events occurring within the room within an episode, such as 24 hours, and records the scene using video capture for processing. The episode therefore contains periods of activity (people entering and using a room) and inactivity (the room is empty). During the episode it may be possible to observe groups of people entering, using and exiting the room, using the room for various purposes, such as meetings or telephone conferences. This video capture forms the initial phase of the method of producing a summary in accordance with an exemplary embodiment of the present invention.)

The data obtained during the video capture is sent to be processed to create an event log. This may be done either at the episode capture device, in this example, at the camera, or may be done remotely over a communications network such as the internet (at a remote server, in the Cloud) or at a processor in communication with the device, such as over a local area network (LAN). The processing may be done live, that is during the video capture stage, or subsequently, once the video capture stage is complete, or at an offset, for example, 30 minutes post-video capture.

Once events are identified an event log can be created. The sensory information may comprise data relating to the output of visual or non-visual sensors. An event may be detected and/or identified by any of these sensors, for example, an optical beam motion detector detects the movement of a person through the door of the conference room. In this situation, the event is generated by an object, the person, and the presence of a person is identified in the room. The episode capture device may also determine the presence of static items in the room, such as chairs, which information is fed into the event log when required.

Visual sensory information obtained from the visual sensors is logged. This may include:

Determining whether motion occurs, what type of motion occurs, how much motion occurs, the direction and speed of any motion;

Determining whether there are any objects present, the number of objects present;

Determining the classification of any objects, including person, pet, inanimate object such as a chair; and Determining the identification of an object using a recognition technology, for example, facial recognition methods.

Non-visual sensory information obtained from the visual sensors is logged. This may include:

Logging the position of any objects using GPS (global positioning system) co-ordinates, geo-fencing or other positioning mechanism;

Logging audio data in any applicable format;

Logging temperature; and

Logging acceleration, direction and height above sea level (altitude).

The sensory information is used to create contextual tags, that when applied to the data allow a user to create meaningful summaries. The contextual tag indicates the context of the event, and may be specific context or more general context. For example, the tag may be "at least one person present", or "more than one person present", or "more than one person present and that there is interaction between the people", or "a meeting is in progress". In the present example the contextual tag indicates that a particular event is a meeting. The timestamp data may be applied separately to the event, or may be part of the contextual tag, or the contextual tag may in fact be the timestamp data. When a group of people enter the room, a contextual tag indicating the start of a meeting is assigned. If a single person enters the room and uses the telephone, the camera assigns a contextual tag indicating that the room is being used for a private call. If the camera is connected to a communications network over which a presentation in the meeting room is accessed, the camera may assign contextual tags representing the start of a meeting, the end of a meeting, a break occurring within a meeting, or specific parts of a presentation. In this way the contextual tags can be generated using information directly available via the camera (such as observing the video scene), but may also use information available via other sensors/systems (i.e. information related to use of a projector).

A summary is created with at least a subset of the events based upon the contextual tags. In the present example, the summary performs the function of a report to a conference room organiser showing the use of the facilities. The summary report could take various forms. For example, the summary report may be a text based report, a video summary, or a text report with "clickable" thumbnails of significant events. The conference room organiser may search the summary by time stamp data or contextual tag. By providing information regarding a subset of events to a user a summary allows the user to monitor the episode and the scene effectively. Note that it may also be desirable to include periods of inactivity in the episode summary. For example, a facilities manager may find information about how frequently conference rooms are vacant to be useful. In another example, a healthcare worker may use the summary report to understand the activity (or lack of activity) of a patient.

As part of the summary of events, events observed in a scene may be matched to stored or input data in order to produce a more meaningful summary as part of the summary. The episode capture device may be furnished with identity information about frequent occupants of the room, such that it can identify specific room occupants. Contextual tags may be added in order to identify specific room occupants in a summary. The stored or input data identifies an object, which may be a person, and the stored or input data may be used to choose and assign a contextual tag identifying the person. This enables a user to determine if only authorised people such as employees enter the conference room, or whether it is used frequently by non-employees, such as customers or clients. As part of the identification process, if the stored or input data matching step identifies a person, it may be desirable to use characteristic identification techniques, such as facial recognition techniques. This may then be used to determine the subset of events included in the summary, matching events observed in the scene to the stored or input data to create matched events based upon the contextual tags, such that the subset of events contains the matched events.

Other Examples.

The facial recognition example outlined above is a special case of where an event is triggered by an object. In this situation, the episode capture device identifies the object within the scene (the person), and identifies a characteristic of the object (the name of the person), and both the identity of the object (that it is a person) and the characteristic (the name of the person) are included in the summary. This may be the case for other objects, such as identifying a burning candle in a room—initially the candle is identified and then that it is burning is inferred from its temperature.

Object Monitoring.

In another example a camera may be used to monitor a room for theft. The contents, or objects, in the room may be logged. Settings may be configured such that events are only triggered if an object is removed from the scene or the position of the object changes. Thus people could enter or exit the scene without triggering an event, as long as the objects are not removed or moved.

Interaction with Smart Phone.

The episode capture device is preferably configured to connect to a data network, such that it may interact and/or communicate with other devices, such as smartphones and tablet computers. Processing to create the event log and the summary may take place at the episode capture device or remotely. Sensors may be provided within the episode capture device, or within external devices, or worn on a person or provided within a scene may be programmed either to monitor events, monitor a scene or to trigger events. For example, a camera may be configured to interact with a movement sensor within a smartphone to record that a meeting attendee entered the scene at a walking pace and left the scene at a running pace. Further, the camera may record that a smartphone belonging to a particular user enters the region of a local area network (WiFi) that denotes the periphery of a scene, and therefore has entered the scene. In the above example, a camera is used as the episode capture device, and audio data is used to enhance the video data obtained. However, other sensors may be used to capture events, such as, but not limited to, a motion sensor, including the combination of a motion sensor with an algorithm capable of identifying certain types of motion, proximity sensor, temperature sensor, capacitive sensor, inductive sensor, magnet, microphone, optical sensor, antenna, Near Field Communication and similar devices.

Other Sensors.

An episode capture device is therefore a device that is capable of recording an event, and the data obtained may be used appropriately to create a summary. Typical episode capture devices include image capture devices (cameras, in the visible, infrared or ultraviolet spectra) that may be digital (including CCD and CMOS devices). Such devices are provided with visual and non-visual sensors either integral with the episode capture device (an accelerometer in a mobile phone having a camera) or separate to but in communication and connection with the episode capture device, so as to be in effect functionally integrated. In the case of a temperature sensor, the sensor may detect that the temperature of a room increases at 6 AM, and decreases at 8 PM. It identifies these points as dawn and dusk, and applied contextual tags appropriately to each point. Episode capture devices may be used separately or together to enhance a summary. Consider the situation where a shop monitors stock using magnetic tags, which trigger an alarm when passed through an induction loop, and uses a system. It would be possible to combine a first episode capture device, such as a camera and a second episode capture device, such as an induction sensor system and to assign contextual tags at certain events. An item bearing a tag may be taken through the induction sensor, thus triggering an alarm. At this point a contextual tag may be assigned to the video feed obtained from the camera system and a summary generated accordingly.

User Criteria for Events.

The format of the summary may be adapted to include any event information that is of interest to a user. In the case of a summary indicating the use of a conference room, the summary may include details of attendees including their identity, still images, audio recordings, information on types of events, and details of use that flags some kind of warning. Contextual tags added to the data captured by the episode capture device enable the summary to be as detailed or as concise as desired. This may be where the device is unable to determine the identity of a person, or unable to associate an event with an approved use of the room. The user may select from various pre-programmed options, or provide various criteria matching the contextual tags on which the summary may be based. This may include type of event, frequency of event, length of video sequence, date and time, geographic location, audio content, as examples, although many other criteria are possible. Storing criteria or inputting criteria to the image capture device, either directly or remotely, to form stored or input criteria and generating the summary using the stored or input criteria allows the user complete freedom of use. The user may build a bespoke summary format or choose from a pre-programmed selection. The summary may be generated by the episode capture device, a device in which the camera is positioned or using a remote system.

Summary Formats.

The summary may take various formats, depending on user preference. One format is to show a video feed of all events and periods of inactivity at a changeable speed, such as time-lapse or hyperlapse. Another is to combine a subset of certain events into a single video feed, for example, where these events are chosen by a user, as above, or where the events are chosen using stored or input data to create matched events. It is possible to delete or remove unimportant events based upon user criteria. For example, a user may specify that only meetings where there are 4 or more people present must be included in the summary. The episode capture device records all of the events during the episode, and then selects only those corresponding to a meeting with 4 or more people present, effectively discarding all other events recorded.

Weighting.

One further possibility is prioritising events using a weighting or other prioritisation method, such as a binary selection scheme. Using a weighting method, a weighting is applied to an event, such that the subset of events in the summary is determined by the weighting. The weighting itself is determined by a characteristic of an event, for example, the number of people in a meeting room, the identity of pets rather than persons, the temperature of an object. In the above example this is illustrated by considering that the meeting room has a maximum capacity of 6, and that an organiser is interested in finding out whether the room is being used to its maximum capacity. One way of doing this is to assign a weighting to each event where fewer than 6 people attend a meeting, for example, and event where one person uses the room has a weighting of 5, two people using the room has a weighting of 4, and so on. Initially the user may select a summary based upon events having a weighting of 5 or less.

However, the user may wish to prioritise entries within the summary. In this situation the weighting determines the prioritisation of the events within the subset. In the meeting room example, events may be listed in order of the highest weighting first. In one embodiment, a weighting scale of 0-1, or 1-10 is used for each element weighted. The presence of significant motion is used as a filter before anything is weighted. After that filter is passed, the total of the weights are simply added together for each video event or image. For example, the presence of a lot of motion may contribute a weighting of 8 on a scale of 1-10. The presence of people tagged as important by the user may add a weight of 7 for each such person present. The presence of other people may provide a weight factor of 4 each. The duration of significant motion may add a weight of 1 for each minute, up to a total of 10 minutes. Thus, in one example, the weighting is as follows for a 10 minute video event (note that individual parts of the clip may have different weights):

Two unknown people (4 points each=8 points.
One important person=7 points
Significant motion=8 points
Duration of motion is five minutes=5 points
Total=28 point weighting In one embodiment, events that are considered for summarization are within a specified period of time (e.g., from midnight until now, or during the last 2 hours, etc.) and contains significant motion (after the filtering step). Alternately, a summary, rather than being a specified period of time, can be defined by a number of events, a percentage of events recorded, all events above a certain score, etc.

In one embodiment, event scoring is based on the following cues:

1. Event scoring.
   a. gap before event: event gets a higher score if there was nothing happening before that event for a long period.
   b. event duration: lower score for very short events.
   c. motion location and size: higher score for motion that is in the center and has a larger extent.
   d. motion anomaly: a model of past motion detected is created. A new motion observation gets a higher score, if it is abnormal given the previous content. This can also be seen as a notion of 'surprise.'
   e. number of objects: higher score if more objects are moving in the event.
   f. detections: some detected concepts lead to higher scores, such as a detected person, a detected face, regions of skin color, etc.
   g. image quality: contrast, sharpness of the image or distribution of colors.

In one embodiment, scores are combined using a weighted average. Other methods for combinations are also possible. In an alternate embodiment, scores and weights are adapted or added/omitted based on the user's general preferences or user specifications for one summary.

In one embodiment, the weights don't include the time of day, when the event appears. This is handled in the second step:

2. select events, using a greedy approach. pseudocode:
while totalSummaryDuration<targetDuration do:
   A. select the highest weighted event and add it to the summary
   B. reweight all the other events, according to their temporal distance with respect to the selected event.

This will ensure not to choose two events which happen one after the other, but rather select events that are diverse across the full time range. In one embodiment, some heuristics are added to ensure some regular distribution over time. The reweight factor depends on the total summary time range: e.g., reweighting is different for a 1 hour period than for a 24 hour period.

In one embodiment, for long periods of no activity (for example, in a living room where a person is at work all day, and the only motion is present in the morning and the evening), 'filler' is added. That is, the playback speeds are adjusted, as already discussed above. A time lapse with 1 frame every 6 min is used for no activity periods, whereas a 'hyper lapse' style video is played for motion events (e.g., speeding up normal speed by a factor of 8). Of course, other particular time periods and speeds can be used.

Cloud Storage.

The episode capture device may make use of cloud data storage to create or enhance the episode capture device or within a cloud data storage facility. Data may then be downloaded from the cloud data storage as and when desired in creating a summary, such that at least one step in the method outlined above occurs using this data. This enables even devices with small memory capacity to be configured to create a summary, since at least one step outlined in the method above may take place remote from the episode capture device. The ability to store and access large amounts of data relating to events and a scene also enables the creation of enhanced summaries.

Enhanced Summaries.

A detailed summary may be considered as comprising many layers of information, summarising video data, audio data, geographic data and so on. This layered approach allows a user to zoom into certain areas of interest. For example, in the conference room scenario above, a conference organiser receives a summary of a day's conference. This includes details of all participants, copies of presentations and handouts, all movement and geographical information as well as video and audio data of the events during the conference or of various conferences which took place in the respective conference room monitored by the event capture device. The organiser is told that a certain event, such as a presentation, happened at a particular time. The organiser can zoom into the summary at various times, and chooses to zoom into the event. The detail within the summary allows the organiser to review and select a particular event, and to choose to have video data of the event streamed to a device to view. This may be a device that the organiser chooses to view the summary on or another device. For example, the organiser may choose to view the summary on a smartphone. However, in order to view video data the organiser prefers to use a tablet computer. Once the zoom into the summary is chosen using the smartphone, the organiser is able to stream video content of the event to the tablet computer.

The layering approach also facilitates an automatic edit of the summary depending on the amount of data a user can receive. For example, if a user is accessing the summary using a smartphone connected to a cellular data network, a short version of the summary containing only highlights with hyperlinks to further content is transmitted, since, for example, if the cellular data network is a 3G network, data transfer is relatively slow and the user may prefer not to receive and download a high volume of data. Furthermore, summary information in text form, for example, the. occurrence of a certain event or appearance of a certain person, may be transmitted to a mobile device of a user, in the form of a short message (such as SMS, MMS or text) and/or making use of push-functionality for notification. The type of information provided to the user in this manner may be determined by a user or sent according to pre-determined criteria. However if a user is accessing the summary via a local area network (Wi-Fi) or other data connection, a more detailed summary may be transmitted. The episode capture device may be pre-programmed with information specific to the room in which it is located. Alternatively a user may notify the camera of its location once it has been placed within a room.

Alternate Embodiments.

The present invention is not limited to the exemplary embodiment described above. It is possible to utilise the invention in a wide variety of applications, for example, home security, surveillance, monitoring (such as a baby monitor or pet monitor), room or facility usage (such as designated equipment or apparatus), indeed any situation where it is required to be able to monitor a scene remotely to determine the occurrence of events. Suitable episode capture devices include digital cameras, digital video cameras, cameras within smartphones, tablet computers, laptops or other mobile devices, webcams, and similar. Such cameras should be adapted to communicate data via a network to a client computer, software program, an app on a mobile device or, in general, to a suitable storage device, wherein such storage devices may include additional processing capacities for subsequent image processing. Cameras may be dedicated devices or multipurpose, that is, with no fixed designation with regard to monitoring a scene for events In general, the episode capture device comprises a processor able to access a software module configured to perform the method outlined above In an exemplary embodiment the software module is based on the determination of certain criteria, either pre-defined or selectable by a user, for the identification of certain events. Subsequently, for example, upon selection by the user, a summary comprising a summary is created based on selected criteria, such as a certain event, optionally in combination with another constraint, for example, the maximum length of the summarising video sequence or a predetermined data volume. This results in a parameter-dependent automated video analysis method, in which significantly less video data has to be evaluated to determine if an event has occurred within a scene.

These and other embodiments not departing from the spirit and scope of the present invention will be apparent from the appended claims.

What is claimed is:

1. A method for displaying video summaries to a user comprising:
    upon launch of an application on a computing device having a display, providing one of the group of: a live video stream from a remote camera, a video event from the remote camera, a summary of video events from the remote camera, and an image from the remote camera;
    providing by a processor in the computing device multiple indicators on the display indicating stored, detected important video events;
    upon detection by the processor of selection on the display of an indicator by the user, providing a time-lapse summary of the selected event;
    providing a time of day indication on the display along with the selected event;
    wherein one of the indicators is for
    a time-lapse display of all the events in sequence in a designated timer period, using a more condensed time lapse than the time lapse for individual video events;
    wherein less important events have less time; and
    applying a weighting to the events such that events with a higher weight are provided one of more time and a slower time lapse.

2. The method of claim 1 wherein the indicators are a series of bubbles, with each bubble including an indication of when an event occurred.

3. The method of claim 1 wherein the indicators further indicate the relative importance of the events with color coding.

4. The method of claim 1 wherein the images provided upon launch include multiple images from multiple remote cameras.

5. The method of claim 1 further comprising;
    scrolling through the indicators in response to a user swipe action on a display;
    enlarging a current indicator; and
    provide a display of at least one image from the video event corresponding to the current indicator.

6. The method of claim 1 wherein one of the indicators is provided for a summary of video events, the summary consisting of video events for a day.

7. The method of claim 1 wherein one of the indicators is provided for a summary of video events, the summary consisting of video events since a last launch of an application for implementing the method of claim 1.

8. The method of claim 1 wherein a live video stream from a remote camera is provided upon launch, with the live video stream having a lower resolution than the time-lapse summary of the selected event.

9. A method for displaying video summaries to a user comprising:
    upon launch of an application on a computing device having a display, providing one of the group of: a live video stream from a remote camera, a video event from the remote camera, a summary of video events from the remote camera, and an image from the remote camera;
    playing a summary of video events;
    wherein the summary of video events comprises a series of video events from a remote camera over a designated period of time;
    wherein the summary video is a time-lapse summary of intermittent video events where motion was detected;
    revising the playback speed of portions of the summary selected by the user:
    providing an indicator on the display for a time-lapse display of all the events in sequence in a designated timer period, using a more condensed time lapse than the time lapse for individual video events;
    wherein less important events have less time; and
    applying a weighting to the events such that events with a higher weight are provided one of more time and a slower time lapse.

10. A computing device having a display for displaying video summaries to a user comprising:
    a processor configured, upon launch of an application on the computing device, to provide one of the group of: a live video stream from a remote camera, a video event from the remote camera, a summary of video events from the remote camera, and an image from the remote camera;
    the processor being further configured to provide multiple indicators on the display indicating stored, detected important video events;
    the processor being configured, upon detection of selection on the display of an indicator by the user, to provide a time-lapse summary of the selected event;

the processor being configured to provide a time of day indication on the display along with the selected event;

wherein one of the indicators is for a time-lapse display of all the events in sequence in a designated timer period, using a more condensed time lapse than the time lapse for individual video events;

wherein less important events have less time; and the processor is configured to apply a weighting to the events such that events with a higher weight are provided one of more time and a slower time lapse.

11. The device of claim 10 wherein the images provided upon launch include multiple images from multiple remote cameras.

12. The device of claim 10 further comprising;

the processor being configured to scroll through the indicators in response to a user swipe action on a display;

enlarging a current indicator; and provide a display of at least one image from the video event corresponding to the current indicator.

13. The device of claim 10 wherein one of the indicators is provided for a summary of video events, the summary consisting of video events for a day.

14. The device of claim 10 wherein one of the indicators is provided for a summary of video events, the summary consisting of video events since a last launch of an application.

15. The device of claim 10 wherein the processor is configured to provide a live video stream from a remote camera upon launch, with the live video stream having a lower resolution than the time-lapse summary of the selected event.

16. The device of claim 10 wherein the processor is configured to display video summaries to a user by playing a summary of video events;

wherein the summary of video events comprises a series of video events from a remote camera over a designated period of time;

wherein the summary video is a time-lapse summary of intermittent video events where motion was detected; and the processor being configured to revise the playback speed of portions of the summary selected by the user.

17. The device of claim 10 wherein the indicators are a series of bubbles, with each bubble including an indication of how long ago an event occurred.

18. The device of claim 10 wherein the indicators further indicate the relative importance of the events with color coding.

* * * * *